United States Patent
Hu et al.

(10) Patent No.: US 12,264,092 B2
(45) Date of Patent: Apr. 1, 2025

(54) CONSTRUCTED WETLAND SYSTEM ENHANCED BY IMMOBILIZED LACCASE

(71) Applicant: SHANDONG UNIVERSITY, Shandong (CN)

(72) Inventors: Zhen Hu, Jinan (CN); Xinhan Chen, Jinan (CN); Jian Zhang, Jinan (CN); Huijun Xie, Jinan (CN); Shuang Liang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 388 days.

(21) Appl. No.: 17/791,444

(22) PCT Filed: May 11, 2021

(86) PCT No.: PCT/CN2021/092936
§ 371 (c)(1),
(2) Date: Jul. 7, 2022

(87) PCT Pub. No.: WO2021/238640
PCT Pub. Date: Dec. 2, 2021

(65) Prior Publication Data
US 2023/0048966 A1   Feb. 16, 2023

(30) Foreign Application Priority Data

May 29, 2020   (CN) .......................... 202010474725.X

(51) Int. Cl.
*C02F 3/32* (2023.01)
*C02F 3/34* (2023.01)
(Continued)

(52) U.S. Cl.
CPC ................ *C02F 3/342* (2013.01); *C02F 3/32* (2013.01); *C02F 2101/30* (2013.01); *C02F 2103/26* (2013.01)

(58) Field of Classification Search
None
See application file for complete search history.

(56) References Cited

FOREIGN PATENT DOCUMENTS

| CN | 104313006 A | 1/2015 |
|----|-------------|--------|
| CN | 204625324 U * | 9/2015 |

(Continued)

OTHER PUBLICATIONS

Luo et al.; "Application of Low-Molecular Weight Phenois Isolated from Black Liquors as Natural Mediators of Laccase;" Transactions of China Pulp and Paper, 2008; pp. 102-106; vol. 23, No. 3.
(Continued)

*Primary Examiner* — Chester T Barry
(74) *Attorney, Agent, or Firm* — Oliff PLC

(57) ABSTRACT

A constructed wetland system enhanced by immobilized laccase, it includes wetland plants, a matrix layer and a water distribution system, the wetland plants growing on the matrix layers, the matrix layer including a laccase catalyst and gravel, the laccase catalyst and gravel are distributed at intervals in a modular manner in a ratio of 1:5, the water distribution system is arranged on both sides of the matrix layer. The laccase catalyst is prepared by using a co-immobilization technology. The system improves the removal effect of hard-to-degrade organic matter in wastewater, and solves the problems of toxicity and stress of the hard-to-degrade organic matter existing in the prior art and the problems of matrix adsorption saturation.

13 Claims, 2 Drawing Sheets

(51) Int. Cl.
  *C02F 101/30* (2006.01)
  *C02F 103/26* (2006.01)

(56) References Cited

FOREIGN PATENT DOCUMENTS

| | | | | |
|---|---|---|---|---|
| CN | 105505914 | A | 4/2016 | |
| CN | 106145545 | A * | 11/2016 | ............... C02F 9/00 |
| CN | 106191023 | A | 12/2016 | |
| CN | 207210196 | U | 4/2018 | |
| CN | 111019934 | A | 4/2020 | |
| CN | 111675342 | A | 9/2020 | |
| JP | 2001-157576 | A | 6/2001 | |
| KR | 2005-0109183 | A | 11/2005 | |
| KR | 2015-0071565 | A | 6/2015 | |
| WO | 01/21332 | A1 | 3/2001 | |

OTHER PUBLICATIONS

Feb. 19, 2021 Office Action and Search Report issued in Chinese Patent Application No. 202010474725.X.
Jul. 28, 2021 Search Report issued in International Patent Application No. PCT/CN2021/092936.
Jul. 28, 2021 Written Opinion of the International Searchng Authority issued in International Patent Application No. PCT/CN2021/092936.

\* cited by examiner

CONSTRUCTED WETLAND SYSTEM ENHANCED BY IMMOBILIZED LACCASE

CROSS-REFERENCES TO RELATED APPLICATIONS

This application claims priority benefits to Chinese Patent Application No. 202010474725.X, filed 29 May 2020, the contents of which are incorporated herein by reference.

TECHNICAL FIELD

The present invention belongs to the field of wastewater treatment technology, and specifically relates to a constructed wetland system enhanced by immobilized laccase.

BACKGROUND

The disclosure of information in the background is intended to increase understanding of the general background of the invention and is not necessarily taken to acknowledge or in any form imply that such information constitutes the prior art that has become well known to those of ordinary skill in the art.

Wastewater treatment plants are reservoirs and sources of release of toxic and hazardous substances. In particular, the wastewater contains various organic substances, and the existing wastewater treatment methods, which deal with organic substances, are susceptible to the problems of poisoning by organic substances and saturation by matrix adsorption.

Constructed wetland, as an ecological engineering wastewater treatment technology, has the advantages of low capital construction investment, low operation cost and beautiful ecological landscape, and can effectively purify wastewater by using the comprehensive ecological functions of plants, matrixs and microorganisms. It has outstanding application advantages in the fields of watershed water pollution control, reclaimed water reuse and ecological restoration. However, the current constructed wetland system mainly focuses on the removal of conventional pollutants such as COD, nitrogen and phosphorus. With the increasing risk of water safety of reclaimed water reuse such as difficult to degrade organic matter, it is facing more and more challenges. Studies have shown that in constructed wetlands, organic matter such as polycyclic aromatic hydrocarbons and antibiotics have stable chemical properties and are difficult to be degraded by microorganisms; in the process of matrix adsorption, organic matter is easily protected by matrix minerals or humus, which makes organic matter more unavailable and causes the phenomenon of "false low" concentration of organic matter.

Laccase (EC1.10.3.2), as the simplest copper-containing polyphenol oxidase, is commonly found in various organs and tissues of plants and fungi, generally more in the young parts and less in the mature parts, and belongs to the same family of blue polycopper oxidases as ascorbate oxidase in plants and ceruloplasmin in mammals. Laccase can oxidize a wide range of aromatic and non-aromatic compounds under micro-oxygen conditions through a continuous single-electron oxidation process via the unique redox ability of T1, binuclear T2 and T3 copper atoms. Although laccase can be secreted by plants in constructed wetlands to degrade hard-to-degrade organic matter, the effect is limited by the small amount of secretion. The modified constructed wetland with laccase can obtain good catalytic ability and enhance the ability of degradation of organic matter in constructed wetland. Laccase can also promote the growth of wetland plants due to its rich variety of elements, enhance the absorption of N, P and other elements by wetland plants, and strengthen the nitrification and denitrification capacity of wetlands, thus improving the nitrogen and phosphorus removal capacity of wetlands. However, there are major problems in the catalytic process of laccase: firstly, the low redox potential of T1 copper atoms as direct electron acceptors limits the catalytic activity of many hard-to-degrade organic matter; secondly, how laccase can be applied in constructed wetlands; thirdly, free laccase is not reusable, which limits the application of laccase in practical wastewater treatment.

SUMMARY

In response to the above-mentioned problems in the prior art, the present invention provides a constructed wetland system enhanced by immobilized laccase.

The technical solution of the present invention is described as follows.

An constructed wetland system enhanced by immobilized laccase, comprising wetland plants, a matrix layer and a water distribution system, the wetland plants growing on the matrix layers, the matrix layer comprising a laccase catalyst module and a gravel module which are vertically arranged, the laccase catalyst module and the gravel module are arranged at intervals in the horizontal direction, the water distribution system is arranged on both sides of the matrix layer, a perforated water inlet pipe is arranged in the matrix layer, the perforated water inlet pipe is connected with the water distribution system.

The purpose of setting the water distribution system is to provide sufficient water to the matrix layer.

The constructed wetland system of the present invention effectively removes the hard-to-degrade organic matter in the waste by using the laccase catalyst and the gravel layer, and simultaneously solves the problems of toxicity and stress of the hard-to-degrade organic matter existing in the prior art. In addition, the laccase catalyst of the present invention can be reused, so that the problems of matrix adsorption saturation and the like are solved.

Beneficial effects of the present invention:

(1) The treatment of wastewater in the present invention is mainly based on laccase catalyst, supplemented by root absorption of aquatic plants, so that the aquatic plants are less affected by the poisoning and the stress action of the hard-to-degrade organic matter.

(2) The reeds, calamus and cattails used in the present invention have a high economic value and ornamental value while having a decontamination function, effectively solving the problem of high cost caused by large floor space.

(3) The method of the present invention has more significant effect on wastewater treatment, especially on the treatment of hard-to-degrade organic matter in constructed wetlands.

BRIEF DESCRIPTION OF THE DRAWINGS

The accompanying drawings, which are incorporated in and constitute a part of the present invention, are included to provide a further understanding of the invention, and the description of the exemplary embodiments and illustrations of the invention are intended to explain the invention and are not intended to limit the invention.

Figure 1:
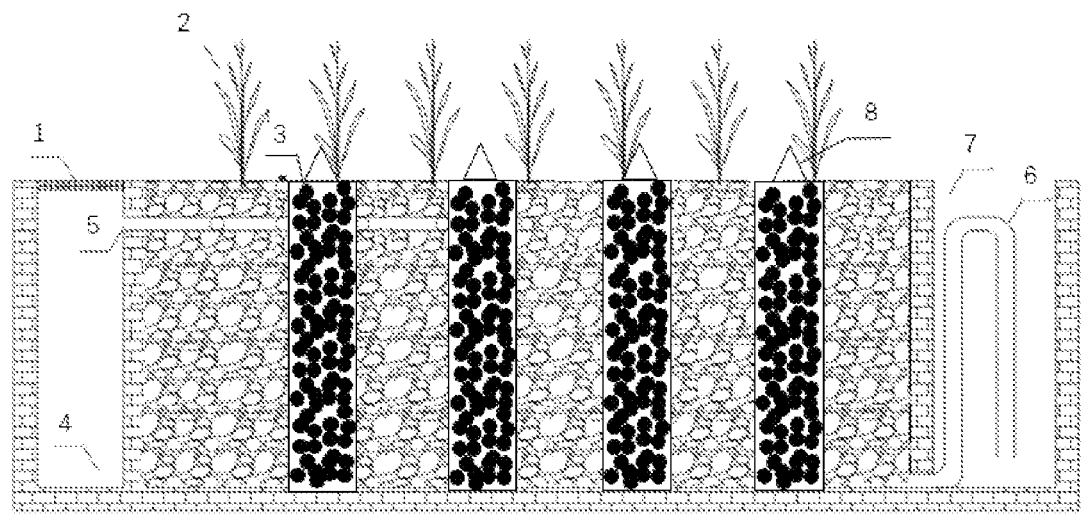
FIG. 1 is a diagram of a constructed wetland system.

Wherein, 1: movable cover plate; 2: wetland plant; 3: laccase efficient-catalyst; 4: water inlet channel; 5: perforated water inlet pipe; 6: water collecting pipe; 7: water outlet channel; 8: pull ring.

DETAILED DESCRIPTION

It should be noted that the following detailed descriptions are exemplary and are intended to provide further illustration of the present invention. Unless otherwise indicated, all technical and scientific terms used herein have the same meaning as commonly understood by one of ordinary skill in the art to which the present invention belongs.

It should be noted that the terminology used herein is intended to describe specific embodiments only and is not intended to limit the exemplary embodiments according to the present invention. As used herein, unless the context clearly indicates otherwise, the singular form is also intended to include the plural form, and it is further understood that when the terms "comprising" and/or "including" are used in this specification, they indicate the presence of features, steps, operations, devices, components, and/or combinations thereof.

In the present invention, a constructed wetland system enhanced by immobilized laccase is provided, the constructed wetland system comprises wetland plants, a matrix layer and a water distribution system, the wetland plants growing on the matrix layers, the matrix layer comprising a laccase catalyst module and a gravel module which are vertically arranged, the laccase catalyst module and the gravel module are arranged at intervals in the horizontal direction, the water distribution system is arranged on both sides of the matrix layer, a perforated water inlet pipe is arranged in the matrix layer, the perforated water inlet pipe is connected with the water distribution system.

The present invention mainly uses laccase catalyst and gravel synergistically as the matrix layer to form the constructed wetland system. The degradation ability of organic matter in constructed wetland system is improved. Gravel is a kind of rock or ore debris, and laccase catalyst is filled in gravel in a modular way. Wetland plants grow on top of the matrix layer. In this way, a constructed wetland system is formed.

The gravel module can be fixed by a stainless steel mesh structure, the laccase catalyst is placed in the closed bag body structure, the bag body can be made of permeable geotextile, and the top of the bag body is provided with a hole-shaped structure and a hand lifting structure (such as pull ring 8). Wastewater can pass through the mesh of stainless steel and the permeable holes of geotextile.

In some embodiments of the present invention, the volume ratio of laccase catalyst to gravel is 1-2:8; preferably 1:5. The volume ratio of laccase catalyst to gravel refers to the volume ratio of all laccase catalyst modules to all gravel modules. The filling is carried out in a modular manner, and when the laccase catalyst fails, the laccase catalyst module can be taken out by pulling the pull ring, and the laccase catalyst module can be replaced by a new laccase catalyst module, or the matrix unit in the module can be replaced. The addition ratio of laccase catalyst affects the degradation effect of constructed wetland, which can effectively remove the hard-to-degrade organic matter in the wastewater.

In some embodiments of the present invention, the wetland plant is selected from any one or more of the groups consisting of reed, calamus, cattail and iris.

In some embodiments of the present invention, the wetland plant has a planting density in a range of 9 to 25 plants/m$^2$; preferably 9 to 15 plants/m$^2$.

In some embodiments of the present invention, the water distribution system comprises an water inlet channel and an water outlet channel, the water inlet channel and the water outlet channel are respectively arranged on both sides of the matrix layer and are respectively arranged to be closed with the matrix layer, a water inlet is arranged in an upper part of the matrix layer, and the water inlet of the matrix layer is communicated with the water inlet channel, a perforated water inlet pipe is arranged at a corresponding position in the upper part of the matrix layer, and the perforated water inlet pipe is connected with the water inlet, an water outlet is arranged at the bottom of the matrix layer, a water collecting pipe is arranged inside the water outlet channel, an opening at the first end of the water collecting pipe is connected with the water outlet of the matrix layer, and an opening at the second end is arranged inside the water outlet channel.

Preferably, the perforated water inlet pipe is arranged horizontally in the matrix layer, the perforated water inlet pipe is arranged to enter the matrix layer from the water inlet of the matrix layer, a plurality of water outlet holes are arranged on the side wall of the perforated water inlet pipe, the water collecting pipe is a U-shaped pipe, the water collecting pipe is inversely arranged in the water outlet channel, and two ends of the bottom of the water collecting pipe are respectively provided with an opening, the first opening is connected with the water outlet of the matrix layer, and the second opening is arranged above the bottom of the water outlet channel. The inlet water enters into the matrix layer along the perforated water inlet pipe, flows from the upper part of the matrix layer to the lower part, and then flows out along the water collecting pipe arranged as a U-shaped pipe.

In some embodiments of the present invention, the laccase catalyst consists of the following in parts by weight: 8-12 g of laccase natural phenol medium extract, 0.2-0.8 g of sodium alginate, 0.05-0.5 g of laccase, 0.2-1 g of chitosan, 1-1.25 g of acetic acid, 0.1-0.6 g of calcium chloride, wherein sodium alginate and calcium chloride are carriers, laccase natural phenol medium extract and laccase are active substances, chitosan and acetic acid are modifiers.

Firstly, the laccase catalyst of the present invention solves the problem of low redox potential of T1 copper atoms as direct electron acceptors when laccase is used as a catalyst in the prior art and the problem of limiting the catalytic activity of many hard-to-degrade organic matter; the principle by which this problem is solved is that the present invention improves laccase with chitosan and conducts electrons through laccase natural phenol medium extracts as medium intermediates, making the speed of catalytic reaction is accelerated and the efficiency is increased. Secondly, the problem of non-reusable free laccase (i.e. laccase not immobilized by the method of the present invention) is solved, and the problem is solved by the principle that laccase and natural phenol media extracts are co-fixed by the method of adsorption and embedding, and the immobilized laccase is prepared by using sodium alginate-calcium chloride composite carrier as the immobilization carrier, so that laccase and natural phenol media extracts are attached inside the gels, which prevents the loss of laccase in the catalytic treatment process. Thirdly, the present invention proposes a laccase modified matrix to realize that laccase can be applied in constructed wetlands.

In some embodiments of the present invention, the laccase catalyst consists of the following in parts by weight: 9-11 g of laccase natural phenol medium extract, 0.5-0.5 g of sodium alginate, 0.05-0.5 g of laccase, 0.5-0.6 g of chitosan, 1.1-1.25 g of acetic acid, 0.5-0.6 g of calcium chloride, wherein sodium alginate and calcium chloride are carriers, laccase natural phenol medium extract and laccase are active substances, chitosan and acetic acid are modifiers.

Preferably, the laccase catalyst consists of the following in parts by weight: 10.00 g of laccase natural phenolic media extract, 0.50 g of sodium alginate, 0.30 g of laccase, 0.50 g of chitosan, 1.25 g of acetic acid, 0.50 g of calcium chloride.

Preferably, the laccase catalyst consists of the following in parts by weight: 10.00 g of laccase natural phenolic medium extract, 0.50 g of sodium alginate, 0.50 g of laccase, 0.50 g of chitosan, 1.25 g of acetic acid, 0.50 g of calcium chloride.

In some embodiments of the present invention, the laccase natural phenol media extract is extracted from soybean meal. Soybean meal is a by-product obtained after soybean oil is extracted from soybeans.

In some embodiments of the present invention, the laccase catalyst has a spherical structure with an average diameter of 3-5 mm.

In some embodiments of the present invention, the laccase catalyst is prepared by dissolving the laccase natural phenol media extract in the solution of sodium alginate and then mixing with the laccase to obtain a mixture A;

dissolving chitosan, and mixing with the solution of acetic acid and the solution of calcium chloride to obtain a mixture B;

dripping the mixture A into the mixture B and separating to obtain the laccase catalyst.

In some embodiments of the present invention, a method for extracting laccase natural phenolic media extract, comprising shaking extraction of soybean meal with deionized water, followed by passing through a cellulose acetate membrane.

Preferably, a time of extraction of soybean meal is 3-5 days, a volume of deionized water corresponding to 1 g soybean meal is 25-35 mL, and a pore size of cellulose acetate membrane is 0.4-0.5 mm.

In some embodiments of the present invention, dissolving the laccase natural phenol media extract in the solution of sodium alginate by an oscillating mixing method.

Preferably, the oscillation mixing method adopts an oscillation frequency of 100-150 rpm, a mixing temperature of 50-70° C. and an oscillation time of 10-30 hours.

In some embodiments of the present invention, the solution of sodium alginate has a concentration of 2.0-3.0% (w/v).

In some embodiments of the present invention, a method for dissolving chitosan, and mixing with the acetic acid and the solution of calcium chloride comprises dispersing the chitosan and the solution of acetic acid, and then adding the solution of calcium chloride.

Preferably, the chitosan has a concentration of 1.5-2.5% (w/v); preferably, the solution of acetic acid has a concentration of 4.0-6.0% (w/v); preferably, the solution of calcium chloride has a concentration of 1.5-2.5% (w/v).

In some embodiments of the present invention, after the step of dropping the mixture A into the mixed liquid B and separating, hardening is carried out to obtain the laccase catalyst, and the time of hardening time is 5-7 hours.

The present invention will be further described with reference to the following examples.

Example 1

A laccase catalyst with high-efficiency, consisting of the following in parts by weight: 10.00 g of laccase natural phenolic media extract, 0.50 g of sodium alginate, 0.30 g of laccase (EC1.10.3.2), 0.50 g of chitosan, 1.25 g of acetic acid, 0.50 g of calcium chloride, wherein sodium alginate and calcium chloride are carriers, laccase natural phenol medium extract and laccase are active substances, chitosan and acetic acid are modifiers.

The laccase catalyst has a spherical structure with an average diameter of 4 mm.

Laccase natural phenol medium extract is extracted from soybean meal.

Example 2

The method of preparing the laccase catalyst of Example 1, comprising the steps of:
(1) oscillating 10 g soybean meal with 300 mL deionized water at 160 rpm for 4 days, and filtering through 0.45 mm cellulose acetate membrane to obtain a soybean meal extract, namely laccase natural phenol medium extract;
(2) dissolving the soybean meal extract obtained in step (1) in a solution of sodium alginate at a concentration of 2.5% (w/v), and oscillating at 120 rpm and 60° C. for 24 h to obtain a mixed system;
(3) uniformly stirring the mixed system obtained in step (2) with 0.3 g laccase to obtain a mixture;
(4) using 2.0% (w/v) chitosan as modifier, ultrasonic dispersing in a solution of acetic acid at a concentration of 5.0% (w/v) for 30 min, adding a solution of calcium chloride at a concentration of 2.0% (w/v) to obtain a solution system;
(5) dripping the mixture obtained in step (3) into the solution system obtained in step (4) through a syringe needle to form spherical bead with uniform size and diameter of 4 mm, namely laccase biocatalytic beads;
(6) the laccase biocatalytic beads obtained in step (5) were hardened at room temperature for 6 h.

Example 3

A laccase catalyst with high-efficiency, consisting of the following in parts by weight: 10.00 g of laccase natural phenol medium extract, 0.60 g of sodium alginate, 0.40 g of laccase, 0.60 g of chitosan, 1.1 g of acetic acid, 0.60 g of calcium chloride, wherein sodium alginate and calcium chloride are carriers, laccase natural phenol medium extract and laccase are active substances, chitosan and acetic acid are modifiers.

The laccase catalyst has a spherical structure with an average diameter of 4 mm.

Laccase natural phenol medium extract is extracted from soybean meal.

Example 4

The method of preparing the laccase catalyst of Example 3, comprising the steps of:
(1) oscillating 10 g soybean meal with 350 mL deionized water at 180 rpm for 4 days, and filtering through 0.5 mm cellulose acetate membrane to obtain a soybean meal extract, namely laccase natural phenol medium extract;

(2) dissolving the soybean meal extract obtained in step (1) in a solution of sodium alginate at a concentration of 2.8% (w/v), and oscillating at 150 rpm and 50° C. for 20 h to obtain a mixed system;

(3) uniformly stirring the mixed system obtained in step (2) with 0.4 g laccase to obtain a mixture;

(4) using 2.4% (w/v) chitosan as modifier, ultrasonic dispersing in a solution of acetic acid at a concentration of 4.5% (w/v) for 35 min, adding a solution of calcium chloride at a concentration of 2. % (w/v) to obtain a solution system;

(5) dripping the mixture obtained in step (3) into the solution system obtained in step (4) through a syringe needle to form spherical bead with uniform size and diameter of 4 mm, namely laccase biocatalytic beads;

(6) the laccase biocatalytic beads obtained in step (5) were hardened at room temperature for 5 h.

Example 5

The weight of laccase was 0.05 g, and other conditions were the same as those in Example 1.

Example 6

The weight of laccase was 0.1 g, and other conditions were the same as those in Example 1.

Example 7

The weight of laccase was 0.5 g, and other conditions were the same as those in Example 1.

Example 8

As shown in FIG. 1, a constructed wetland system adopts a horizontal subsurface flow constructed wetland mode, and the system comprises wetland plants 2, matrix layers and a water distribution system, wherein the wetland plants 2 are planted uniformly at a planting density of 9-15 plants/m$^2$, and the wetland plants 2 is selected from any one or more of the groups consisting of reed, calamus, cattail and iris. The material of the matrix layer is laccase catalyst 3 and gravel, and the laccase catalyst and gravel are distributed at intervals in a modular manner in a ratio of 1:5.

The laccase catalyst 3 is placed inside the bag body structure made of permeable geotextile, the top of the bag body is provided with an opening that can be used to grow plants, and the top of the bag body is also provided with a pull ring 8 that can be used to take out or put in the bag body. Since the gravel is placed inside a fixed-shaped permeable structure, the bag body containing the laccase catalyst can be easily taken out and put in and the wastewater can pass through the modules. The gravel module and the laccase catalyst module are separated by a mesh structure, the bottom of the mesh structure is fixed by soil (or other structures) under the matrix layer, and the top of the gravel module can be planted with plants.

The water distribution system comprises an water inlet channel 4 and an water outlet channel 7, the water inlet channel 4 and the water outlet channel 7 are respectively arranged on both sides of the matrix layer and are respectively arranged to be closed with the matrix layer, a water inlet is arranged in an upper part of the matrix layer, and the water inlet of the matrix layer is communicated with the water inlet channel, a perforated water inlet pipe 5 is arranged at a corresponding position in the upper part of the matrix layer, and the perforated water inlet pipe 5 is connected with the water inlet, an water outlet is arranged at the bottom of the matrix layer, a water collecting pipe 6 is arranged inside the water outlet channel, an opening at the first end of the water collecting pipe 6 is connected with the water outlet of the matrix layer, and an opening at the second end is arranged inside the water outlet channel 7.

The perforated water inlet pipe 5 is arranged horizontally in the matrix layer, a plurality of water outlet holes are arranged on the side wall of the perforated water inlet pipe, the water collecting pipe 6 is a U-shaped pipe, the water collecting pipe is inversely arranged in the water outlet channel, and two ends of the bottom of the water collecting pipe are respectively provided with an opening, the first opening is connected with the water outlet of the matrix layer, and the second opening is arranged above the bottom of the water outlet channel.

As shown in FIG. 1, the end of the perforated water inlet pipe 5 is located in the second laccase catalyst module from left to right, such that the wastewater flows downwards and flows from left to right.

The top of the water inlet channel is covered with movable cover plate 1, so that the peculiar smell of wastewater in the water inlet channel can be reduced.

Figure 2:
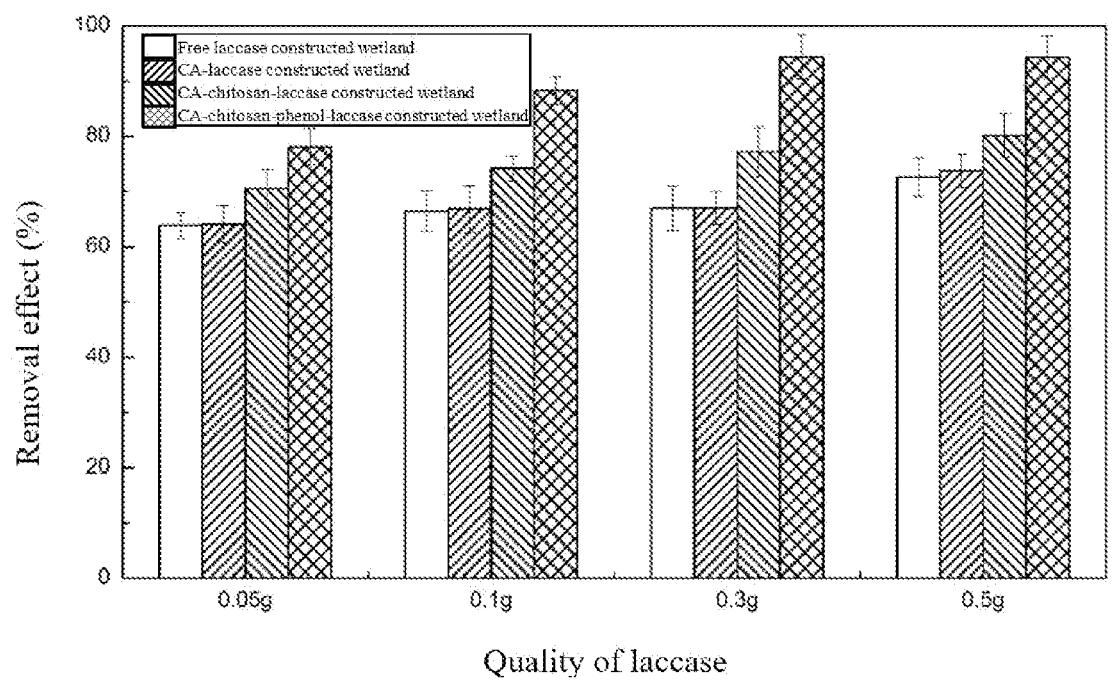
FIG. 2 is a comparison diagram of the quality and removal effect of laccase.
Figure 3:
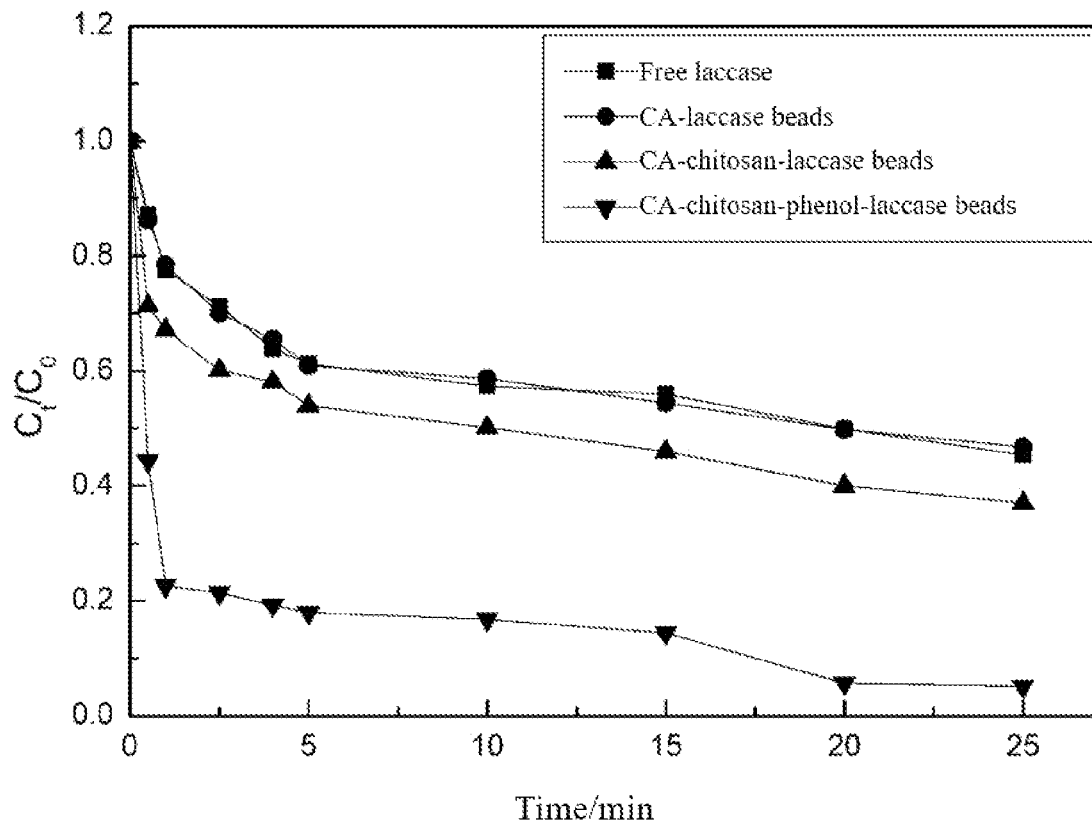
FIG. 3 is a comparison diagram of time and removal effects.
Figure 4:
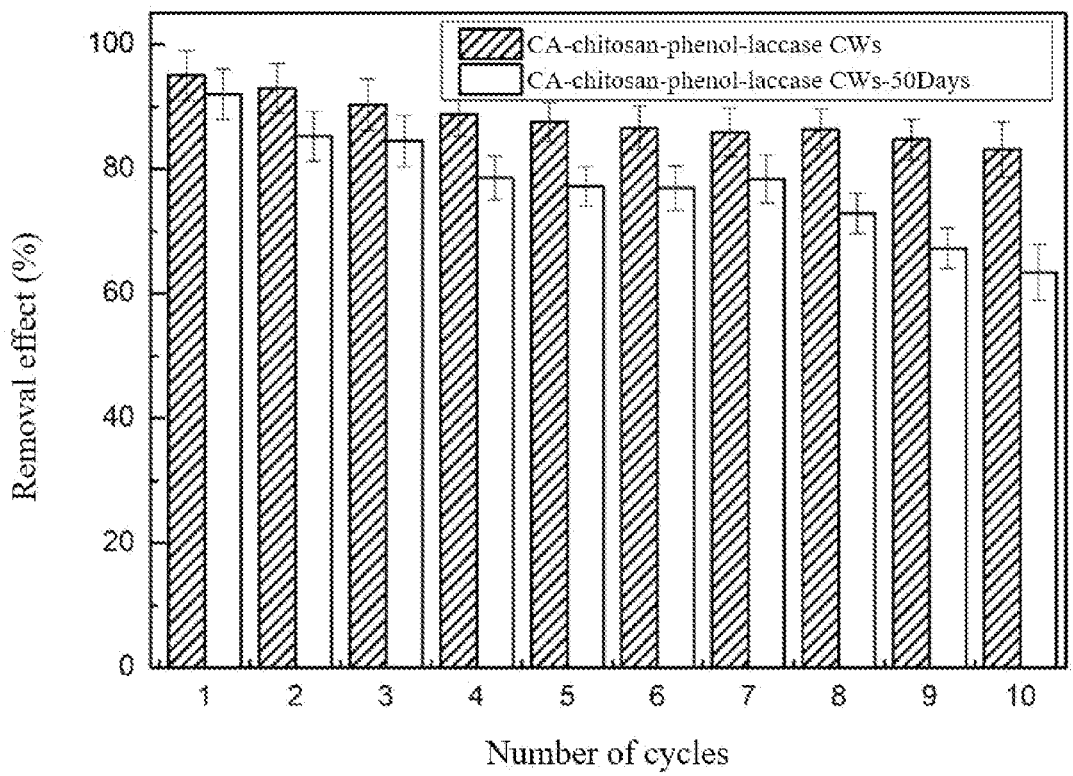
FIG. 4 is a comparison diagram of the number of cycles and the removal effects of the laccase according to Example 1.

As shown in FIG. 2, FIG. 3 or FIG. 4, the constructed wetlands involved in the test include: free laccase constructed wetlands, wherein the catalyst matrix is free laccase; CA-laccase constructed wetland, wherein the catalyst matrix is composed of sodium alginate, calcium chloride and laccase; CA-chitosan-laccase constructed wetland, wherein the catalyst matrix is composed of sodium alginate, calcium chloride, chitosan and laccase; CA-chitosan-phenol-laccase constructed wetland, wherein the catalyst matrix is composed of sodium alginate, calcium chloride, chitosan, phenol medium and laccase (as the laccase catalyst described in Examples 1, 5, 6 and 7 of the present invention).

The constructed wetland is constructed with reference to the method of Example 8. There are four groups in each constructed wetland, the difference between the four groups lies in the amount of laccase used in the catalyst matrix. The catalyst matrix of CA-chitosan-phenol-laccase constructed wetland, namely laccase catalyst, is respectively selected from Example 1, Example 5, Example 6 and Example 7. When other constructed wetlands (such as those shown in the legend of FIG. 2) are constructed, the laccase catalyst described in Example 8 is respectively replaced with their respective catalyst matrix (as mentioned in the previous paragraph). The constructed wetland is used to remove organic matter in wastewater, and then the removal effect is compared. The result is shown in FIG. 2, wherein FIG. 2 shows the removal effect of phenanthrenes (a kind of polycyclic aromatic hydrocarbons). It can be seen that the laccase catalyst of the present invention has better removal effect.

As shown in FIG. 3, the laccase catalyst of the present invention has better wastewater treatment effect for removing phenanthrenes, and the residual amount of organic matter in the wastewater treated by the laccase catalyst of the present invention is less as the time is extended.

As shown in FIG. 4, the laccase of the present invention can be recycled as a high-efficiency catalyst, and can be used for at least 50 days each time (the laccase catalyst module is not taken out for 50 days in the test), and still keeps a good removal effect on phenanthrene.

The above description is only preferred embodiments of the invention and is not intended to limit the invention. For those skilled in the art, the present invention may have various changes and variations. Any modification, equivalent replacement, improvement, etc. made within the spirit and principles of the present invention shall be included in the scope of protection of the present invention.

What is claimed is:

1. A constructed wetland system, comprising:
a matrix layer comprising a vertically oriented laccase catalyst module and a laterally adjacent vertically oriented gravel module;
wetland plants growing on the matrix layer;
a water distribution system arranged on two laterally opposite sides of the matrix layer; and
a perforated water inlet pipe arranged in the matrix layer and connected to the water distribution system,
wherein the laccase catalyst module comprises laccasse catalyst consisting of
8-12 g laccase natural phenol medium extract being an active substance,
0.2-0.8 g sodium alginate being a carrier,
0.05-0.5 g laccase being an active substance,
0.2-1 g chitosan being a modifier,
1-1.25 g acetic acid being a modifier, and
0.1-0.6 g of calcium chloride being a carrier,
wherein the laccase natural phenol medium extract is obtained by passing a shaken mixture of deionized water and a phenol extract of soybean meal through a cellulose acetate membrane.

2. The constructed wetland system according to claim 1, wherein the volume ratio of laccase catalyst to gravel is 1-2:8;
wherein the wetland plants are selected from any one or more of the group consisting of reed, calamus, cattail and iris; and
wherein the wetland plants have a planting density in a range of 9 to 25 plants/m$^2$.

3. The constructed wetland system according to claim 1, wherein the water distribution system comprises a water inlet channel and a water outlet channel,
wherein the water inlet channel and the water outlet channel are respectively arranged on the two laterally opposite sides of the matrix layer and are respectively arranged on the two laterally opposite sides of the matrix layer and are connected to the matrix layer,
wherein a water inlet is arranged in an upper part of the matrix layer and connected to the water inlet channel,
wherein the perforated water inlet pipe is arranged at a corresponding position in the upper part of the matrix layer and is connected with the water inlet,
wherein a water outlet is arranged at a bottom of the matrix layer,
wherein a water collecting pipe is arranged inside the water outlet channel, wherein a first opening at a first end of the water collecting pipe is connected with the water outlet of the matrix layer, and wherein a second opening at a second end is arranged inside the water outlet channel,
wherein the perforated water inlet pipe is arranged horizontally in the matrix layer and enters the matrix layer from the water inlet,
wherein a plurality of water outlet holes are arranged on a wall of the perforated water inlet pipe,
wherein the water collecting pipe is an inverted U-shaped pipe and is arranged in the water outlet channel, and
wherein the first and second ends of the water collecting pipe are respectively provided with the first and second opening.

4. The constructed wetland system according to claim 1, wherein the laccase catalyst consists of the following in parts by weight: 9-11 g of laccase natural phenol medium extract, 0.5-0.6 g of sodium alginate, 0.05-0.5 g of laccase, 0.5-0.6 g of chitosan, 1.1-1.25 g of acetic acid, 0.5-0.6 g of calcium chloride, wherein sodium alginate and calcium chloride are carriers, laccase natural phenol medium extract and laccase are active substances, chitosan and acetic acid are modifiers.

5. The constructed wetland system according to claim 1, wherein the laccase catalyst has a spherical structure with an average diameter of 3-5 mm.

6. The constructed wetland system according to claim 1, wherein the laccase catalyst is prepared by dissolving the laccase natural phenol media extract in a solution of sodium alginate and then mixing with the laccase to obtain a mixture A;
obtaining a mixture B by dissolving chitosan, and mixing with a solution of acetic acid and a solution of calcium chloride;
dripping the mixture A into the mixture B and separating to obtain the laccase catalyst.

7. The constructed wetland system according to claim 6, wherein a time of extraction of soybean meal is 3-5 days, a volume of deionized water corresponding to 1 g soybean meal is 25-35 mL, and a pore size of cellulose acetate membrane is 0.4-0.5 mm.

8. The constructed wetland system according to claim 6, wherein dissolving the laccase natural phenol media extract in the solution of sodium alginate is by an oscillating mixing method;
the oscillation mixing method adopts an oscillation frequency of 100-150 rpm, a mixing temperature of 50-70° C. and an oscillation time of 10-30 hours.

9. The constructed wetland system according to claim 6, wherein the solution of sodium alginate has a concentration of 2.0-3.0%.

10. The constructed wetland system according to claim 4, wherein the laccase catalyst consists of the following in parts by weight: 10.00 g of laccase natural phenol media extract, 0.50 g of sodium alginate, 0.30 g of laccase, 0.50 g of chitosan, 1.25 g of acetic acid, 0.50 g of calcium chloride.

11. The constructed wetland system according to claim 4, wherein the laccase catalyst consists of the following in parts by weight: 10.00 g of laccase natural phenol medium extract, 0.50 g of sodium alginate, 0.50 g of laccase, 0.50 g of chitosan, 1.25 g of acetic acid and 0.50 g of calcium chloride.

12. The constructed wetland system according to claim 6, wherein obtaining the mixture B comprises dispersing the chitosan and the solution of acetic acid, and then adding the solution of calcium chloride; wherein
the chitosan has a concentration of 1.5-2.5%; the solution of acetic acid has a concentration of 4.0-6.0%; the solution of calcium chloride has a concentration of 1.5-2.5%.

13. The constructed wetland system according to claim 6, wherein after dripping the mixture A into mixture B and separating, a hardening step is carried out to obtain the laccase catalyst, and the hardening step is carried out for 5-7 hours.

* * * * *